March 12, 1940.    W. ROTERBERG    2,193,042
TOOL CENTER
Filed May 27, 1938
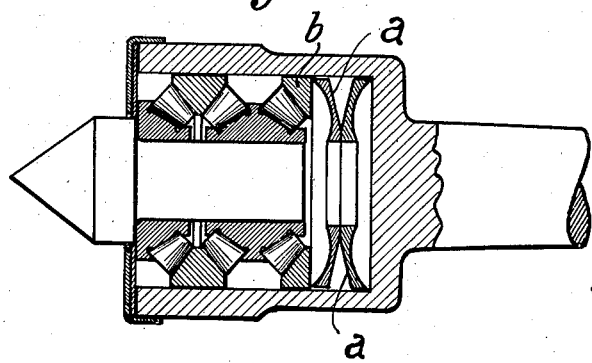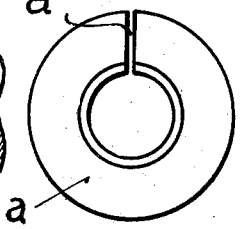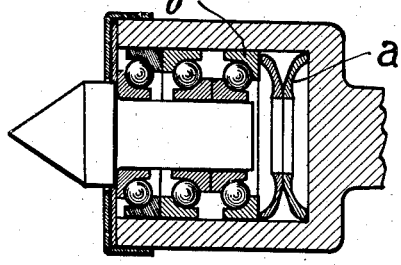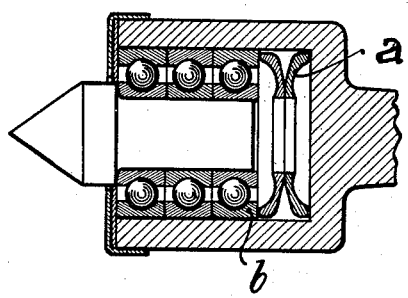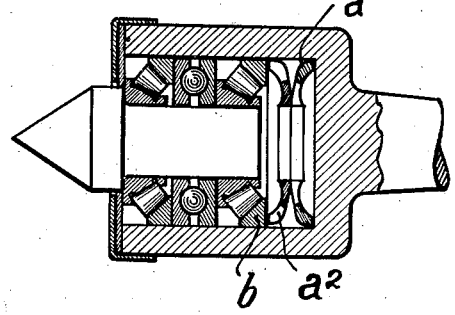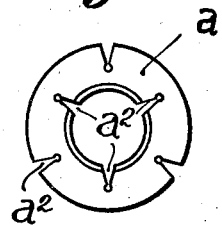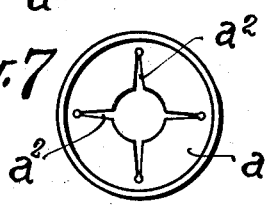
Inventor:
Werner Roterberg
by S. Sokal,
Attorney.

Patented Mar. 12, 1940

2,193,042

UNITED STATES PATENT OFFICE 2,193,042

TOOL CENTER

Werner Roterberg, Dusseldorf, Germany

Application May 27, 1938, Serial No. 210,461
In Germany June 14, 1937

15 Claims. (Cl. 82—33)

Applications have been filed in Germany on the 14th June, 1937, and in Sweden on the 3rd May, 1938.

This invention relates to tool centers and like members of machine tools and has more particular reference to rotating lathe centers adapted to take up and equalise longitudinal expansion in the workpiece caused by heating.

It is known to provide helical springs and fluid checking devices to take up expansion in the workpiece and prevent jamming of the center shaft, which after removal of the load, returns to its normal position. Such devices, however, take up a great deal of room and do not operate satisfactorily with heavy loads.

According to the invention one or more dish-shaped resilient discs are provided against which is supported the last outer ring of the roller bearing or the bush of the plain bearing. The resilient disc consists of annular conically inclined or arched discs of flexible material which is given a yielding construction by means of radial cuts or recesses. In this way a more or less high degree of yielding with a corresponding damping effect can be attained for all loads. In this connection it is essential that the roller bearing race ring which slides in the housing or the plain bearing bush, can be supported against the inner housing face in such a way that the entire bearing system can yield axially but is moved back into the normal position on removal of the load. It is, therefore, a question of a sliding bearing which has no other support in the housing than the resilient disc and in which no play occurs through the movement, as the axial pressure runs through all bearings and produces a permanent installation of the rings with the roller bodies (balls, needles, rollers or the like).

Reference will now be made to the accompanying drawing which illustrates by way of example several forms of construction according to the invention and in which:

Fig. 1 is a sectional elevation of a lathe center provided with two discs according to the invention, Fig. 2 is an elevation of a disc with a radial cut extending from the inner perforation to the outer edge.

Figs. 3 and 4 are views similar to Fig. 1 but with different types of bearings,

Fig. 5 is a sectional elevation of a lathe center having discs provided with interior and exterior cuts, Fig. 6 is an elevation of the disc as in the form of construction according to Fig. 5, Fig. 7 is an elevation of a disc provided with interior cuts only.

The resilient dish-shaped discs $a$ are preferably of conical or dome-shape construction so that one outer edge rests against the last bearing ring $b$ of the roller bearing and the opposite inner edge is supported against the housing face or against a second spring ring $a$. In order to produce a damping spring action suitable for the load occurring the disc is curved out or provided with weakened parts on one or both sides and in addition radial cuts are provided, whereby either flexible tongues are formed or other temporary variations in shape are produced. As shown in Fig. 2, it is sufficient in many cases to cut open the disc in order to give it the necessary elasticity; with an arrangement in pairs the cutting points $a^1$ are displaced from each other. Also by means of alternately arranged cuts $a^2$ of desired shape and depth, as in Fig. 6, a uniformly acting spring effect can be obtained with the smallest axial space requirements. As shown in Fig. 7, the discs can also be provided with inner recesses $a^2$ only. The disc is in this way separated in a novel manner into several individual members. The number, shape and depth of the cuts depends on the existing profile of the discs; in any case, the example of construction shows how all loads occurring can be allowed for or equalised in the simplest manner and a construction with corresponding high tension is possible. The discs can also be provided with concentrically or radially extending corrugations which can be used for the present purpose with or without cuts.

Inasmuch as with rotating centers of large diameter there is a corresponding space at disposal, several pairs of discs can also be arranged behind each other.

The annular shape or the central opening of the discs also gives the possibility of arranging discs between the separate roller bearings if necessary. Moreover, the center shaft can also be carried through the discs if a special bearing is provided for it in the cone.

I claim:

1. A rotating tool center having in combination: a housing; a bearing in said housing; a rotating tool center supported in said bearing and a split annular dish-shaped disc of resilient material to oppose axial movement of the center so as to provide resilience in said discs without substantial alteration of the curvature thereof.

2. A rotating tool center having in combination: a housing; a bearing in said housing; a rotating tool center supported in said bearing; and a plurality of split annular dish-shaped discs of resilient material with their split parts non-coincident with each other, to oppose axial movement of the center so as to provide resilience in said discs without substantial alteration of the curvature thereof.

3. A rotating tool center having in combination: a housing; a bearing in said housing; a rotating tool center supported in said bearing; and a plurality of annular dish-shaped discs of resilient material, formed with exterior marginal recesses, to oppose axial movement of the center so as to provide resilience in said discs without substantial alteration of the curvature thereof.

4. A rotating tool center having in combination: a housing; a bearing in said housing; a rotating tool center supported in said bearing; and a plurality of annular dish-shaped discs of resilient material formed with interior marginal recesses, to oppose axial movement of the center so as to provide resilience in said discs without substantial alteration of the curvature thereof.

5. A rotating tool center having in combination: a housing; a bearing in said housing; a rotating tool center supported in said bearing; and a plurality of resilient annular dish-shaped discs formed with non-coincident interior and exterior marginal recesses, to oppose axial movement of the center.

6. A rotating tool center having in combination: a housing; a bearing in said housing; a rotating tool center supported in said housing; and a plurality of resilient annular dish-shaped discs opposing axial movement of the center, said discs being formed with concentric corrugations so as to provide resilience in said discs without substantial alteration of the curvature thereof.

7. A rotating tool center having in combination: a housing; a bearing in said housing; a rotating tool center supported in said bearing; and a plurality of resilient annular dish-shaped discs opposing axial movement of the center, said discs being formed with concentric corrugations and exterior marginal recesses so as to provide resilience in said discs without substantial alteration of the curvature thereof.

8. A rotating tool center having in combination: a housing; a bearing in said housing; a rotating tool center supported in said bearing; and a plurality of resilient annular dish-shaped discs opposing axial movement of the center, said discs being formed with concentric corrugations and interior marginal recesses so as to provide resilience in said discs without substantial alteration of the curvature thereof.

9. A rotating tool center having in combination: a housing; a bearing in said housing; a rotating tool center supported in said bearing; and a plurality of resilient annular discs opposing axial movement of the center, said discs being formed with concentric corrugations and interior and exterior marginal recesses so as to provide resilience without substantially altering the curvature of the discs.

10. A rotating tool center having in combination: a housing; a bearing in said housing; a rotating tool center supported in said bearing; and a plurality of resilient annular discs opposing axial movement of the center, said discs being formed with radial corrugations to give resilience without substantially altering the curvature of the discs.

11. A rotating tool center having in combination: a housing; a bearing in said housing; a rotating tool center supported in said bearing; and a plurality of resilient annular discs opposing axial movement of the center, said discs being formed with radial corrugations and interior marginal recesses so as to give resilience without substantial alteration of the curvature of the discs.

12. A rotating tool center having in combination: a housing; a bearing in said housing; a rotating tool center supported in said bearing; and a plurality of resilient annular discs opposing axial movement of the center, said discs being formed with radial corrugations and exterior marginal recesses so as to give resilience without substantial alteration of the curvature of the discs.

13. A rotating tool center having in combination: a housing; a bearing in said housing; a rotating tool center supported in said bearing; and a plurality of resilient annular discs opposing axial movement of the center, said discs being formed with radial corrugations and interior and exterior marginal recesses so as to give resilience without substantial alteration of the curvature of the discs.

14. A rotating tool center having in combination: a housing; a bearing formed of thrust and journal members disposed in said housing and supporting a rotating tool center; and split annular dished-shaped discs of resilient material arranged between thrust and journal members to oppose axial movement of the tool center.

15. A rotating tool center having in combination: a housing; a bearing in said housing; a rotating tool center supported in said bearing; and resilient dish-shaped discs formed with weakening grooves, to oppose axial movement of the center and produce resilience in said discs without substantially altering the curvature thereof.

WERNER ROTERBERG.